United States Patent [19]
Kawamoto

[11] Patent Number: 4,509,627
[45] Date of Patent: Apr. 9, 1985

[54] HYDRAULIC CENTRIFUGAL CLUTCH

[75] Inventor: Matsumi Kawamoto, Nagoya, Japan

[73] Assignee: Aisin Warner Kabushiki Kaisha, Anjo, Japan

[21] Appl. No.: 404,729

[22] Filed: Aug. 3, 1982

[51] Int. Cl.³ .............. F16D 25/063; F16D 43/284
[52] U.S. Cl. .................................. 192/85 F; 192/86; 192/103 F; 192/105 A; 192/106 F
[58] Field of Search ........ 192/103 F, 103 FA, 105 A, 192/105 F, 106 F, 85 F, 86, 101, 3.3, 3.31

[56] References Cited

U.S. PATENT DOCUMENTS

| | | | |
|---|---|---|---|
| 2,381,786 | 8/1945 | Tyler | 192/105 A |
| 3,176,813 | 4/1965 | Lee et al. | 192/103 F X |
| 3,213,983 | 10/1965 | Smirl et al. | 192/3.3 |
| 3,250,358 | 5/1966 | Aschauer | 192/105 A |
| 3,295,646 | 1/1967 | Peterson | 192/105 A |
| 3,378,118 | 4/1968 | Maurice | 192/105 A X |
| 3,667,583 | 6/1972 | Richards | 192/105 A |
| 3,750,789 | 8/1973 | Buchelt | 192/105 A |

OTHER PUBLICATIONS

"How Rotation Affects Hydraulic Pressures", Jania and Kushigien, *Machine Design*, 2/55, pp. 180–188.

*Primary Examiner*—Rodney H. Bonck
*Attorney, Agent, or Firm*—Blum Kaplan Friedman Silberman & Beran

[57] ABSTRACT

A hydraulic centrifugal clutch comprises an input shaft; an output shaft; a hydraulic servomechanism including a fixed cylinder fixed to said input shaft, an axially movable piston mounted on said input shaft and forming a first cylindrical chamber in combination with said fixed cylinder, and a fixed piston fixedly mounted on said input shaft and fitted in a cylindrical flange portion of said movable piston for forming a second cylindrical chamber in combination with said movable piston. A friction clutch mechanism is formed between said output shaft and said fixed cylinder, and a diaphragm spring is disposed within said second cylindrical chamber. When the force generated in the hydraulic fluid within said first cylindrical chamber exceeds the sum of the forces generated in the hydraulic fluid within said second cylindrical chamber and the force of said diaphragm spring when said input shaft is rotated, the friction clutch mechanism is engaged by movement of said movable piston by the force generated within said first cylindrical chamber. Thus, the output shaft is connected automatically to the input shaft.

14 Claims, 2 Drawing Figures

HYDRAULIC CENTRIFUGAL CLUTCH

BACKGROUND OF THE INVENTION

This invention relates generally to a centrifugal clutch and more particularly to a centrifugal clutch which is adapted to be engaged and released automatically through the actuation of the friction clutch mechanism thereof by applying a centrifugal force to the hydraulic fluid of a hydraulic servomechanism.

The conventional centrifugal clutch is of a mechanical type provided with several weights pivotally mounted on a flywheel fixed to an input shaft and adapted to control the pressure for engaging or releasing the friction clutch mechanism by means of the centrifugal force acting on the weights. The mechanical centrifugal clutch has disadvantages in that the clutch is heavy in construction owing to the inclusion of a plurality of weights. Many constructional restrictions are unavoidable since the centrifugal force working on the weights must be converted into a pressure or force for engaging the friction clutch mechanism. Further, there is difficulty in setting the rotational rate for engaging or for releasing the friction clutch mechanism since the weights are supported individually for pivotal motion.

What is needed is a centrifugal clutch which eliminates the cumbersome construction and unreliable performance of a mechanical clutch controlled by a flywheel device.

SUMMARY OF THE INVENTION

Generally speaking, in accordance with the invention, a centrifugal clutch in which the friction clutch mechanism is engaged or released automatically by a hydraulic pressure is provided. More particularly a centrifugal clutch is provided which is simply constructed and facilitates setting the rotation rate for actuating the automatic engagement or release of the friction clutch mechanism. The present invention relates to a hydraulic centrifugal clutch comprising an input shaft, output shaft, a servomechanism including a member fixedly mounted on the input shaft, a movable member movable axially on the input shaft and a cylindrical chamber formed between those two members. The clutch further comprises a friction clutch mechanism adapted to be actuated by movement of the movable member of the hydraulic servomechanism for rotationally connecting the input shaft and the output shaft, and spring means adapted to apply a resilient force to the movable member of the hydraulic servomechanism in a direction to release the friction clutch mechanism.

The cylindrical chamber of the hydraulic servomechanism is connected to a pressurized hydraulic fluid source so that the pressurized hydraulic fluid applies a predetermined force to the movable member in a direction to engage the friction clutch mechanism. The spring means applies a force of greater magnitude to the movable member than that of the force of the hydraulic fluid in a direction opposite to that of the force of the hydraulic fluid. When the hydraulic servomechanism is rotated together with the input shaft, a centrifugal force acts on the hydraulic fluid contained within the cylindrical chamber so that the pressure of the hydraulic fluid increases. The friction clutch mechanism is engaged or released automatically at a rotating rate of the input shaft where the force caused by the pressure of the hydraulic fluid within the cylindrical chamber balances substantially with the opposing force of the spring means.

More particularly, the hydraulic servomechanism has two cylindrical chambers of different pressure-receiving areas on opposite sides of the movable member. The pressure of the hydraulic fluid applied to the first cylindrical chamber having a larger pressure-receiving area causes the first cylindrical chamber to produce a force that acts on the friction clutch mechanism in a direction to engage the friction clutch mechanism. At the same time, the pressure of the hydraulic fluid applied to the second cylindrical chamber, having a smaller pressure-receiving area, causes the second cylindrical chamber to produce a force that acts on the friction clutch mechanism in a direction to release the friction clutch mechanism. The spring means is disposed within the second cylindrical chamber.

When the hydraulic servomechanism rotates with the input shaft, a centrifugal force acting on the hydraulic fluid causes the respective counteracting pressures within the first and second cylindrical chambers to increase. The increase in the pressure of the hydraulic fluid within the first cylindrical chamber is greater than that within the second cylindrical chamber. Therefore, a pressure differential between the increased pressure within the first cylindrical chamber and the increased pressure within the second cylindrical chamber acts on the friction clutch mechanism in a direction to engage the friction clutch mechanism. The friction clutch mechanism is automatically engaged or released at a rotational rate of the input shaft where the force of the spring means is counterbalanced by the force caused by the pressure differential.

When the hydraulic fluid is drained from the second cylindrical chamber, the rotational rate of the input shaft for engaging or releasing the friction clutch mechanism is reduced, since the force generated within the second cylindrical chamber by the hydraulic fluid is eliminated.

Accordingly, it is an object of this invention to provide an improved centrifugal clutch wherein hydraulic forces act to perform mechanical functions normally effected through the action of rotating weights in prior art centrifugal clutches.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
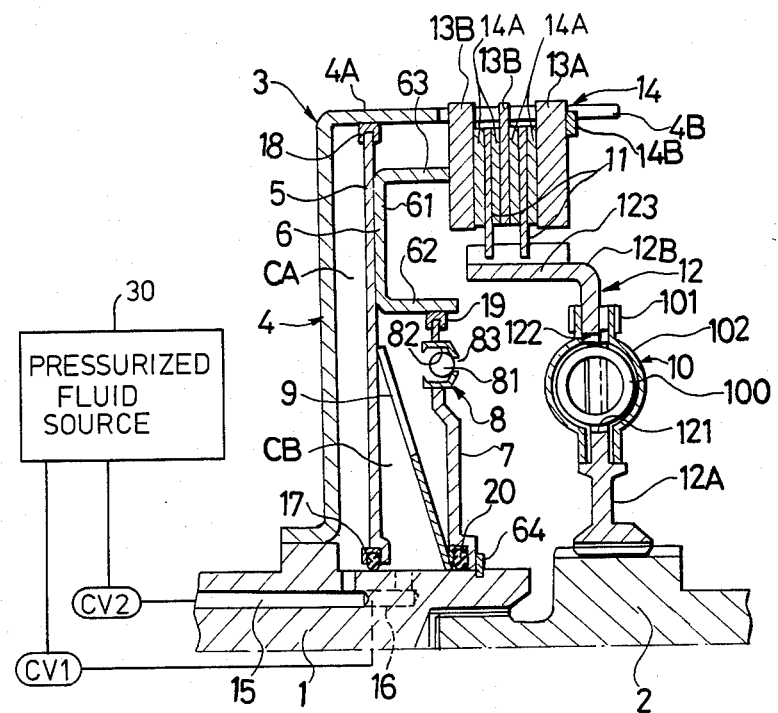
FIG. 1 is a sectional view of the upper half, above the center axis of rotation, of a hydraulic centrifugal clutch in accordance with the invention, as applied in a motor vehicle.

FIG. 1 illustrates a centrifugal clutch in accordance with the invention as applied to a motor vehicle. The centrifugal clutch is generally indicated at 3. An input shaft 1, connected to the output shaft of the engine (not shown) of the motor vehicle, and an output shaft 2 are disposed coaxially for relative rotation. The centrifugal clutch 3 comprises a fixed cylinder 4 fixedly connected to the input shaft 1, a movable piston 5 sidably mounted on the input shaft 1 for axial motion; a fixed piston 7 rigidly connected to the input shaft 1, and a hub 12 mounted slidably on the output shaft 2 for axial motion through engagment of internal splines formed in the hub 12 with external splines formed on the output shaft 2. The centrifugal clutch 3 further comprises a multiple disk clutch mechanism 14 formed between the free end 4B of a cylindrical flange portion 4A of the fixed cylinder 4 and a cylindrical portion 12B extending along the circumference of the hub 12.

The movable piston 5 is an annular plate. The outer circumference of the piston 5 and the inner circumference thereof are respectively in slidable and liquid-tight contact with the inside surface of the cylindrical flange portion 4A, formed along the periphery of the fixed cylinder 4, through a sealing member 18 and with the outside surface of the input shaft 1 through a sealing member 17, to form a cylindrical chamber CA between the fixed cylinder 4 and the movable piston 5.

A pressing member 6, having a first integral cylindrical flange portion 62 and a second integral cylindrical flange portion 63 extending from the inside circumference and the outside circumference, respectively, of a base portion 61, is fixed to the movable piston 5 at the base portion 61 in such a manner that the cylindrical flange portions 62, 63 are aligned coaxially with the input shaft 1. The fixed piston 7 is formed in the shape of an annular plate and is disposed between the input shaft 1 and the pressing member 6. The inner circumference and outer circumference are respectively in liquid-tight fitting engagement with the outside surface of the input shaft 1 through a sealing member 20, and in liquid-tight slidable engagement with the inside surface of the first cylindrical flange portion 62 through a sealing member 19. The piston 7 is arranged radially inside the pressing member 6 to form a cylindrical chamber CB between the movable piston 5 and the fixed piston 7. The fixed cylinder 4, the movable piston 5, the pressing member 6 and the fixed piston 7 constitute a hydraulic servomechanism which rotates together with the input shaft 1.

The cylindrical chambers CA and CB communicate with a source 30 of hydraulic fluid of predetermined pressure by means of passages 15, 16, respectively, drilled in the input shaft 1. The central portion of the fixed piston 7 abuts a snap ring 64 attached to the input shaft 1. A diagrpham spring 9 is disposed between the movable piston 5 and the fixed piston 7 so as to apply a resilient force to the movable piston 5 to the left as illustrated in FIG. 1, namely, in a direction to reduce the volume of the cylindrical chamber CA. The spring 9 also acts so that the fixed piston 7 is fixed to the input shaft 1.

As will be apparent from FIG. 1, and from the above description, the area of the section of the cylindrical chamber CA perpendicular to the input shaft 1 is greater than that of the cylindrical chamber CB perpendicular to the input shaft 1. The diaphram spring 9 is of a well-known type formed by deforming an annular plate spring into the shape of a truncated cone having a center hole and a plurality of resilient finger portions extending radially of the outer circumference thereof.

The diaphragm spring 9 engages with the input shaft 1 and the fixed piston 7 at the edge of the center hole in the spring 9, and the free ends, the resilient finger portions of the spring 9, engage the movable piston 5.

The hub 12 comprises an annular base member 12A which is internally splined for engagement with splines on the output shaft 2, and externally having recesses 121 formed along the periphery thereof for receiving dampers 10, which are described hereinafter. The hub 12 further comprises an annular peripheral member 12B having a cylindrical flange portion 123 extending from the outer circumference thereof concentrically with the output shaft 2. The hub 12 also comprises recesses 122 formed along the inner circumference thereof corresponding to the recesses 121. A pair of curved connecting plates 102 are attached at the outer rims thereof to the peripheral member 12B at the inner rim thereof by means of pins 101, and are circumferentially slidably connected at the inner rims thereof to the outer rim of the base member 12A. The damper 10 consists of the pair of connecting plates 102 and coil springs 100 received in spaces formed by the connecting plates 102 and engaged at the respective ends thereof with the respective edges of the recesses 121 and 122 formed in the base member 12A and the peripheral member 12B, respectively.

The multiple disk clutch mechanism 14 comprises an end plate 13A which is fitted in the free end portion 4B of the cylindrical flange portion 4A of the fixed flange 4 and is restrained from axial movement by a snap ring 14B. The disk clutch mechanism 14 also comprises a plurality of annular pressure plates 13B which are externally splined to engage with internal splines on the free end portion 4B, annular pressure plates 11 internally splined to engage with external splines formed on the outside surface of the cylindrical flange portion 123 of the hub 12, and friction disks 14A attached to both sides of the pressure plates 11 or in alternate embodiments in accordance with the invention, to the pressure plates 13B, or both pressure plates 11 and 13B. The multiple disk clutch mechanism 14 is engaged when the pressure plates 11, 13B and friction disks 14A are pressed to the right (FIG. 1) by the second cylindrical flange portion 63 formed at the outer radius of the pressing member 6 fixed to the movable piston 5.

A centrifugal check valve 8 is received in a through hole formed at an appropriate position in the fixed piston 7. The check valve 8 includes a valve casing 82 in which is received a check ball 81. The valve casing 82 is formed with a valve port 83 for allowing the cylindrical chamber CB to communicate with the outside. The check ball 81 acts to close the valve port 83 when the pressure of the fluid within the cylindrical chamber CB increases. When the fixed piston 7 rotates together with the input shaft 1, a centrifugal force acts on the check ball 81 which tends to move radially outward to open the port 83. Therefore, while the fluid pressure within the cylindrical chamber CB is greater than a predetermined pressure, the valve port 83 is kept closed by the check ball 81, whereas, when the fluid pressure within the cylindrical chamber CB decreases below the predetermined pressure, or when the cylindrical chamber CB is drained, the centrifugal force causes the check ball 81 to move radially outward so that the valve port 83 is open.

In accordance with the construction as described hereinbefore, while no pressurized hydraulic fluid is supplied into the cylindrical chambers CA and CB, the resilient force of the diaphragm spring 9 causes the movable piston 5 to move in a direction to decrease the volume of the cylinder chamber CA. The movable piston 5 is positioned at a left-hand extreme position in FIG. 1, in which the multiple disk clutch mechanism 14 is released.

Figure 2:
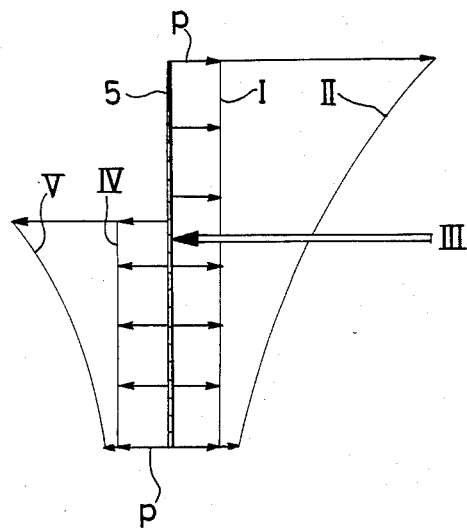
FIG. 2 illustrates the action of forces generated within the clutch of FIG. 1 while the clutch is rotated.

When the pressurized hydraulic fluid of a predetermined pressure p is supplied into the cylindrical chambers CA and CB through the passages 15, 16, respectively, the movable piston 5 moves to the right from the extreme left position, since the pressure-receiving area of the movable piston 5 in the cylindrical chamber CA is greater than that in the cylindrical chamber CB. The distribution of pressure acting on the movable piston 5 in this state is now explained with reference to FIG. 2. The predetermined pressure p acts uniformly on the total area of the surface of the movable piston 5 in the cylindrical chamber CA as indicated by a symbol I, while on the other surface of the movable piston 5 exposed to the cylindrical chamber CB, the predetermined pressure p acts uniformly as indicated by a symbol IV. The concentrated force of the diaphragm spring 9, indicated by a symbol III, is applied to the movable piston 5 at the positions of contact with the finger portions of the diaphragm spring 9. In this state, the multiple disk clutch mechanism 14 is not engaged, therefore, the forces I, III and IV are selected to satisfy an inequality as follows:

$$I < III + IV \tag{1}$$

When the input shaft 1 rotates with pressurized hydraulic fluid supplied to the cylindrical chambers CA, CB, the fixed cylinder 4, the movable piston 5 and the fixed piston 7 rotate together with the input shaft 1. Consequently, centrifugal force acts on the hydraulic fluid in the filled cylindrical chambers CA, CB so that the respective pressures in the cylindrical chambers CA, CB increase by corresponding pressure increments proportional to the respective radiuses of rotation and to the square of the rotational rate of the input shaft 1. When the input shaft 1 rotates at a rate of x rpm, the pressure increments within the cylindrical chambers CA, CB are as indicated by symbols II and V, respectively, in FIG. 2. Accordingly, forces I+II and III+IV+V work on one side and the other side, respectively, of the movable piston 5.

The following inequality is satisfy in order that the multiple disk clutch mechanism 14 is engaged.

$$I + II > III + IV + V \tag{2}$$

Therefore, the critical revolving rate, n rpm, of the input shaft 1 for engaging or releasing the multiple disk clutch mechanism 14, with pressurized hydralic fluid within both cylindrical chambers CA, CB at a pressure p shall satisfy the following equation.

$$I + II = III + IV + V \tag{3}$$

Thus, the multiple disk clutch mechanism 14 starts to have a slipping frictional engagement when the rotational rate of the input shaft increases to the value n rpm. Then, as the rotational rate increases over n rpm, the multiple disk clutch mechanism 14 engages automatically so that the output shaft 2 and the input shaft 1 connect and rotate integrally. When the rotating rate of the input shaft 1, or the output shaft 2, decreases gradually from a rotating rate which is higher than n rpm and reaches n rpm, the multiple disk clutch mechanism 14 starts slipping. After the rotating rate decreases below n rpm, the multiple disk clutch 14 releases automatically.

When the input shaft 1 rotates with the cylindrical chamber CB drained or without the pressure of the hydrualic fluid applied to the cylindrical chamber CB, force IV, generated by the pressure of the hydraulic fluid, and force V, generated by centrifugal force, are not generated within the cylindrical chamber CB. Therefore, forces I+II act on the side of the movable piston 5, whereas only force III of the diaphram spring acts on the other side of the movable piston 5. In this state, a critical revolving rate m rpm of the input shaft 1 for engaging or releasing the multiple disk clutch mechanism 14 satisfies the following equation.

$$I + II = III \tag{4}$$

Thus, when no pressurized hydraulic fluid exists within the cylindrical chamber CB, the multiple disk clutch mechanism 14 does not engage while the rotating rate, x rpm, of the input shaft 1 remains below m rpm, and engages automatically when the rotating rate rises above m rpm. In reducing the rotating rate of the input shaft 1, the multiple disk clutch mechanism 14 releases automatically, when the revolving rate is reduced to m rpm. The rate m is less than the rotational rate n.

Since engagment and release of the multiple disk clutch mechanism 14 are controlled on the basis of an increase in the pressure of the hydraulic fluid resulting from the effect of centrifugal force, it is apparent that the critical rotational rate for engaging or releasing the multiple disk clutch mechanism 14 is dependent on the respective capacities of the cylindrical chambers CA, CB, the respective maximum radiuses of the cylindrical chambers CA, CB, and the spring characteristics of the diaphragm spring 9. Accordingly, setting of the critical rotational rate for engaging or releasing the multiple disk clutch mechanism 14 of the present invention is much easier than that of a centrifugal clutch employing weights for controlling the engagement and release of the clutch mechanism. This is so since capacities and maximum radiuses of the cylindrical chambers, which dominate the magnitude of the effect of centrifugal force, are easy to select the design.

Furthermore, if the pressure of the hydraulic fluid within the cylindrical chamber CA increases after the multiple disk clutch mechanism 14 has engaged automatically, the torque transmitting capacity of the multiple disk clutch mechanism 14 is secured even when the revolving rate of the output shaft 2 is reduced.

It will be understood that, in the embodiment of the hydraulic centrifugal clutch in accordance with the invention as described hereinabove, the critical rotating rate n rpm for an operating mode of the clutch mechanism in which the cylindrical chambers CA, CB are filled with pressurized hydraulic fluid, is significantly greater than the critical revolving rate m rpm for an operating mode in which the cylindrical chamber CB is drained. A centrifugal clutch having such a feature, as stated, is an extremely effective clutch, particularly for the transmission of vehicles, since the multiple disk clutch mechanism will not engage even if the revolving rate of the engine is raised to a substantially high level when the pressurized hydraulic fluid is supplied to the cylindrical chamber CB in starting the engine or when the transmission is shifted to the neutral or parking position. On the other hand, the multiple disk clutch mechanism can engage even when the engine operates at a low rotational rate when the cylindrical chamber CB is drained in shifting the transmission to the running position.

The hydraulic centrifugal clutch in accordance with this invention is suitably used instead of a torque converter or a fluid coupling in an automatic transmission having a torque converter or a fluid coupling. In the described embodiment, the input shaft 1 is connected to the output shaft (not shown) of the engine, while the output shaft 2 is connected to the input of a transmission (not shown) including two sets of planetary gear mechanisms and a hydraulic control circuit. The cylindrical chamber CA is connected to communicate with the source of pressurized hydraulic fluid 30 of the hydraulic control circuit by means of the passage 15 whereas the cylindrical chamber CB is connected to communicate with said source of pressurized hydraulic fluid by means of the passage 16 through closing means such as a change-over valve CV1. In this way, pressurized hydraulic fluid at a predetermined pressure of the hydraulic control circuit is always supplied to the cylindrical chamber CA, whereas the pressurized hydraulic fluid is supplied to the cylindrical chamber CB only when the shift lever of the automatic transmission is shifted to positions, such as the N-position (neutral) and P-position (parking), other than the forward-drive and the reverse-drive positions.

While the engine of the motor vehicle is not operating, the hydraulic fluid is not pressurized, since the pump of the hydraulic circuit is also stopped. Consequently, the movable piston 5 is pushed by the resilient force of the diaphragm spring 9 to the left in FIG. 1 and is positioned at the extreme left position.

When the engine is operated with the shift lever of the automatic transmission positioned at the N-position or the P-position, the multiple disk clutch mechanism 14 will not engage until the rotational rate of the engine reaches n rpm, because the pressurized hydraulic fluid is supplied to the cylindrical chamber CA as well as chamber CB.

When the automatic transmission is shifted to the position for forward running or for reverse running of the vehicle, such as D-position for forward-drive with automatic speed change running, L-position for forward-drive at low speed running, or R-position for reverse-driving running, the cylindrical chamber CB is drained. Then, the check ball 81 of the centrifugal check valve 8 received in the through hole 83 of the fixed piston 7 moves radially outward by the centrifugal force so that the valve port 83 opens and the hydraulic fluid remaining in the cylindrical chamber CB is drained through the valve port 83, since the fluid pressure is eliminated, which has been acting on the check ball 81 to press the check ball 81 to close the valve port 83. In this state, the forces IV and V (FIG. 2) working within the cylindrical chamber CB are absent, therefore, the multiple disk clutch mechanism 14 engages automatically when the rotating rate of the input shaft 1 exceeds m rpm (m<n) so that the output shaft 2 is connected to the input shaft 1 for unitary rotation.

Providing that the rotating rate of a gasoline engine for automatic engagement or release of the clutch is 2000 rpm, which is the rotating rate for engaging the clutch in an ordinary automobile, the centrifugal clutch 3 starts a slipping frictional engagement immediately before the rotational rate of the input shaft 1 reach 2000 rpm. The clutch 3 connects the output shaft 2 to the input shaft 1 automatically at the revolving rate of 2000 rpm of the input shaft 1, when the capacity of the cylindrical chamber CA and the resilient force of the diaphragm spring 9 are designed so as to establish the relationship between the forces II and III at 2000 rpm as represented by an equation $$II = III \tag{5}$$

When the rotating rate of the output shaft 2 is decreased from a rate higher than 2000 rpm, the multiple disk clutch mechanism 14 starts slipping at 2000 rpm and the multiple disk clutch mechanism 14 releases automatically after the rotational rate becomes slightly less than 2000 rpm.

The torque transmitting capacity of the multiple disk clutch mechanism 14 can be increased through operation of a change-over valve CV2 by changing-over the pressure of the hydraulic fluid supplied to the cylindrical chamber CA at the moment of engagement of the centrifugal clutch 3 to a pressure higher than the pressure applied to the cylindrical chamber CA at the moment of automatic engagement of the centrifugal clutch. Such application of a higher hydraulic fluid pressure is effective when the transmission is shifted to the L-position for forward-drive low speed running which is employed in running for a long distance at low speed or in climbing an upward slope.

In the exemplary application of the hydraulic centrifugal clutch in accordance with the invention as described hereinbefore, a multiple disk clutch mechanism 14 is used for connecting the input shaft 1 and the output shaft 2, however, it is obvious that a single disk clutch mechanism or a cone clutch mechanism can also be used and that the function, construction and operation of the movable member and those of the fixed member of the hydraulic servomechanism may be interchanged in modifications in accordance with the invention.

As described hereinbefore, in accordance with the invention, automatic engagement and release of the friction clutch mechanism are attained through the combined effect of the pressure of the hydraulic fluid supplied to the cylindrical chambers and the pressure increase in the hydraulic fluid within the cylindrical chambers resulting from rotation of the hydraulic centrifugal clutch, therefore, the setting of the critical rotational rate for engagement and release of the friction clutch mechanism can easily be attained and the design of the form of the cylindrical chambers is optional. Accordingly, the hydraulic centrifugal clutch in accordance with the invention is useful as a clutch of the transmission for vehicles, since the construction of the rotary parts of the centrifugal clutch can be simplified as well as reduced in weight.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A hydraulic centrifugal clutch, comprising:
   an input shaft;
   an output shaft;
   a hydraulic servomechanism including a first fixed member fixed to said input shaft, a movable member axially slidable with respect to the said input shaft, a first cylindrical chamber formed between said first fixed member and said movable member and adapted to receive a hydraulic fluid therein from a source of hydraulic fluid at a predetermined pressure for moving said movable member in one axial direction of said input shaft, and a second cylindrical chamber having a pressure receiving area smaller than the pressure receiving area of said first cylindrical chamber, said second cylindrical chamber being formed between a second fixed member and said movable member and adapted to move said movable member in the other axial direction of said input shaft at the reception of said hydraulic fluid therein, said first and second cylindrical chambers and the fluid therein rotating with said input shaft, the pressure of said fluid increasing due to a centrifugal force in proportion to the rate of rotation of said input shaft;
   centrifugal check valve means including a valve casing being received in a through hole formed in said second fixed member, a valve port formed in said valve casing for allowing said second cylindrical chamber to communicate with the outside of the second cylindrical chamber and a check ball movably received in said valve casing and adapted to be moved for closing said valve port by the pressure of said fluid within said second cylindrical chamber when said pressure is greater than a predetermined value and said check ball being adapted to move radially outward within said valve casing for opening said valve port by means of a centrifugal force acting on said check ball when the pressure of said fluid within said second cylindrical chamber is smaller than the predetermined value;
   a clutch mechanism interposed between said input shaft and said output shaft and adapted to be engaged to connect said output shaft to said input shaft by movement of said movable member as a result of said hydraulic fluid pressure generated within said first chamber;
   bias means for applying a force counteracting the force applied to said movable member by the hydraulic fluid within said first cylindrical chamber, said counteracting force being applied to said movable member of said servomechanism; and
   said clutch mechanism being automatically engaged or released at a rotational speed of said input shaft where the sum of the pressure force of said hydraulic fluid within said first cylindrical chamber and the force generated by centrifugal force acting on said hydraulic fluid within said first cylindrical chamber counterbalances the sum of the pressure force of said hydraulic fluid within said second cylindrical chamber, the force generated by centrifugal force acting on the hydraulic fluid within said second cylindrical chamber, and the force of said bias means.

2. A hydraulic centrifugal clutch as claimed in claim 1, wherein said clutch mechanism is a frictional clutch mechanism, said friction clutch mechanism being adapted to frictionally engage said output shaft to said input shaft.

3. A hydraulic centrifugal clutch as claimed in claim 2, wherein said bias means is interposed between said input shaft and said movable member of said servomechanism.

4. A hydraulic centrifugal clutch as claimed in claim 1 or 2, wherein said clutch mechanism is a friction clutch mechanism and said input and said output shaft are frictionally engaged by said clutch mechanism by movement of said movable member.

5. A hydraulic centrifugal clutch as claimed in claim 1 or 3, wherein said first fixed member is formed in the shape of a cylinder and the inner circumference and outer circumference of said movable member are in liquid-tight fitting engagement with the outside surface of said input shaft and the inside surface of said cylinder, respectively, to form said first cylindrical chamber between said cylinder and said movable member, said movable member acting as a piston axially slidable on said input shaft.

6. A hydraulic centrifugal clutch as claimed in claim 5, wherein said clutch mechanism is formed between the wall of said cylinder and said output shaft, said piston being adapted to apply a force to said clutch mechanism.

7. A hydraulic centrifugal clutch as claimed in claim 5, wherein said movable member is formed in the shape of an annular plate axially slidable on said input shaft.

8. A hydraulic centrifugal clutch as claimed in claim 5 or 6, wherein said movable member is formed in the shape of an annular plate axially slidable on said input shaft.

9. A hydraulic centrifugal clutch as claimed in claim 8, wherein said clutch further comprises a hub axially slidable on said output shaft and said clutch mechanism is formed between the wall of said cylinder and said hub.

10. A hydraulic centrifugal clutch as claimed in claim 5 wherein said clutch further comprises a hub axially slidable on said output shaft and said clutch mechanism is formed between the wall of said cylinder and said hub.

11. A hydraulic centrifugal clutch as claimed in claim 1, wherein said first and second cylindrical chambers are concentric with said input shaft, respectively.

12. A hydraulic centrifugal clutch as claimed in claim 1, wherein said bias means comprise a diaphragm spring having a center hole receiving said input shaft therethrough and a plurality of finger portions formed along the outer periphery thereof, said diaphragm spring being engaged with said input shaft at said center hole thereof, said finger portions resiliently pressing said piston.

13. A hydraulic centrifugal clutch as claimed in claim 1, and further comprising draining means for draining said second cylindrical chamber when communication of said second cylindrical chamber with said source of hydraulic fluid is interrupted, said clutch mechanism being automatically engaged or released at an input shaft rotational rate which is lower than the rotational rate for releasing said clutch mechanism when said second chamber is filled with said pressurized fluid.

14. A hydraulic centrifugal clutch as claimed in claim 1, wherein said first fixed member fixed to said input shaft comprises a cylindrical portion provided concentrically on said input shaft, said movable member being inserted in said cylindrical portion with the peripheral surface of said movable member being in fitting engagement with said cylindrical portion, said first cylindrical chamber being formed between said cylindrical portion and one side of said movable member, and further comprising a cylindrical flange portion on said movable member external of said first cylindrical chamber, said second fixed member being provided concentrically with respect to said input shaft and fitted at the peripheral surface thereof in said cylindrical flange portion, said second fixed member having a radius smaller than that of said cylindrical portion, and said clutch mechanism being formed between said cylindrical portion of said first fixed member and said output shaft.

* * * * *